(12) United States Patent
Frebel et al.

(10) Patent No.: US 6,421,255 B1
(45) Date of Patent: Jul. 16, 2002

(54) DC-TO-DC CONVERTING CIRCUIT

(75) Inventors: Fabrice Frebel, Limbourg; Paul Bleus, Liege, both of (BE)

(73) Assignee: C.E. & T., Wandre (BE)

( * ) Notice: Subject to any disclaimer, the term of this patent is extended or adjusted under 35 U.S.C. 154(b) by 0 days.

(21) Appl. No.: 09/762,150

(22) PCT Filed: Jul. 27, 1999

(86) PCT No.: PCT/BE99/00095

§ 371 (c)(1),
(2), (4) Date: Jan. 31, 2001

(87) PCT Pub. No.: WO00/08741

PCT Pub. Date: Feb. 17, 2000

(30) Foreign Application Priority Data

Jul. 31, 1998 (EP) ............................................. 98870170

(51) Int. Cl.[7] ............................................. H02M 3/335
(52) U.S. Cl. ....................................... 363/20; 363/21.04
(58) Field of Search ............................... 363/20, 21.02, 363/21.04, 131

(56) References Cited

U.S. PATENT DOCUMENTS 5,331,534 A * 7/1994 Suzuki et al. ................. 363/20
5,523,936 A * 6/1996 Leu et al.
5,883,795 A * 3/1999 Farrington

* cited by examiner

Primary Examiner—Adolf Deneke Berhane
(74) Attorney, Agent, or Firm—Knobbe, Martens, Olson & Bear, LLP (57) ABSTRACT

The invention concerns a dc-to-dc converter controlled by a rectangular signal comprising an input for a direct voltage source ($V_{DC}$), a transformer comprising a primary coil (1) connected to the direct voltage source ($V_{DC}$) and a secondary coil (2), a single switch (S) series-connected with the primary (1) and the direct voltage source ($V_{DC}$), an output comprising the transformer secondary (2) and at least a tertiary coil (3) located in the proximity of the primary (1) and secondary (2) coils at the transformer core series-connected with a first diode (D1). The invention is characterized in that the tertiary coil (3) is arranged on a branch parallel to the branch comprising the primary coil (1) and has the same winding direction as the primary coil (1), and the converter further comprises a capacitor (C) with magnetic inversion for resetting the transformer, located between the branch comprising the primary coil (1) and the switch (S) and the branch comprising the tertiary coil (3) and the first diode (D1), and the second diode (D2) having the blocking direction with respect to the direct voltage source ($V_{DC}$), itself series-connected to the tertiary coil (3).

16 Claims, 13 Drawing Sheets

DC-TO-DC CONVERTING CIRCUIT

FIELD OF THE INVENTION

The present invention relates to a forward-transfer DC/DC conversion circuit.

The present invention relates more particularly to a new forward-transfer converter circuit known as a "forward converter".

BACKGROUND OF THE INVENTION

In the field of DC/DC converters, it is known practice to use converters to transform a unipolar voltage, which is preferably a direct voltage, into another unipolar voltage, which is preferably a direct voltage, while at the same time ensuring galvanic isolation. One type of converter is known as a "forward" converter.

Galvanic isolation consists in isolating the primary winding from the secondary winding of a transformer, also referred to hereinbelow as primary and secondary, respectively, and in making it possible to have a potential difference across the secondary which is different from that across the primary.

The transformer ratio is the voltage across the secondary relative to the voltage across the primary.

The "forward" converter has the drawback of accumulating magnetization energy on the core of the transformer.

It is known practice in the prior art to use an additional winding placed on the core of the transformer, referred to hereinbelow as a tertiary winding or more simply a tertiary, which returns this magnetization energy to the voltage source so as to extract this magnetization energy.

Several types of "forward" converter may be distinguished, in particular the one-switch forward converter, two-switch forward converter or parallel forward converter.

As regards the present invention, the one-switch forward converter forms the basis of the invention.

It has the property of being able to process very large currents, which, by actuating the switch from the open position to the closed position, make it possible to produce the non-conducting phase and the conducting phase.

The non-conducting phase serves to discharge the magnetization energy accumulated on the core of the transformer, while the conducting phase serves to convert the supply voltage.

However, in order to ensure complete demagnetization after the conducting phase, it is currently necessary for the non-conducting phase to be long enough and for it to last for at least 50% of the full cycle of the cumulative conducting and non-conducting phases.

In technical terms, this behavior is characterized by a duty cycle (time closed over total period) of less than or equal to 50%.

Two main problems arise in practice during the use of the one-switch forward converter.

First, the energy yield is reduced due to the fact that there is a conversion time, i.e. a conduction time of the switch which is shorter than the restoration or demagnetization time of the transformer, and, in addition, due to the fact that the energy contained in the leakage inductance is not recovered.

Secondly, it is necessary to oversize most of the components, and in particular the switch and the transformer, since they are subject to sudden changes in voltage or current that are very large in value.

For the one-switch "forward" converters, the prior art discloses the use of diodes of "clamping" type and/or non-dissipative switching circuits ("snubbers").

These modifications of the standard forward converter make it possible, on the one hand, to return the energy stored in the magnetization and leakage inductances of the transformer to the voltage source, and, on the other hand, to limit, to a predetermined value, of the order of twice the input direct voltage, the overvoltages across the switch.

Thus, compared with the conventional assembly, document U.S. Pat. No. 4,268,898 proposes to insert a capacitor in series between the primary and tertiary windings of the transformer. The diode conducts in the direction of return of the energy to the source via the tertiary winding of the transformer. The capacitor between the primary and tertiary windings is similarly featured in the article by Machin and Dekter (Proceedings of: "19th International Telecommunications Energy Conference, INTELEC97—19/23 October, Melbourne, Australia"). By means of this capacitor, the diode begins to conduct once the voltage across the switch exceeds twice the input voltage.

In the assemblies disclosed in document DE-A36 34990 and in the article by Varga and Losic (Proc. 4th Annual Applied Power Electronics Conf. And Exp. (APEC), Baltimore, Mar. 13–17, 1989, pp. 40–45), it is proposed to place a second diode in series with the tertiary winding, in the same conducting direction as the primary winding. A capacitor is connected firstly between the primary winding of the transformer and the switch, and secondly between the two diodes.

As in the case of the conventional forward assembly, these variants still have the tertiary winding in the opposite direction to that of the primary winding and a cyclic ratio of less than or equal to 0.5. This is a considerable limitation with respect to the amount of energy which can be transferred to the load placed on the secondary side of the transformer.

In addition, the number of turns n3 on the tertiary winding is generally equal to the number of turns n1 on the primary winding (n3/n1=1).

Document EP-A-0 474 471 discloses a converter for converting direct voltage by zero-voltage rectangular signal switching, including an input for a source of direct voltage, a transformer comprising a primary winding and, connected to the first input, a main switch connected in series with the primary winding and the input of the source of direct voltage, as well as a clock signal generator to control the main switch. This converter comprises an auxiliary switch and a magnetic reversal capacitor connected in series with the primary winding and with the input of the source of direct voltage, this auxiliary switch being controlled by the clock signal generator in phase opposition relative to the main switch, and serves to reset the transformer. It also includes switching delay means.

SUMMARY OF THE INVENTION

The aim of the present invention is to obtain an improvement in the conventional one-switch forward converter electronic circuit, while avoiding the drawbacks of the prior art.

Another aim of the present invention is to propose better exploitation of the electronic components which constitute the body of the electronic circuit and to distribute the energy better throughout all of the said components.

In particular, one aim of the present invention is to increase the power density both per unit volume and weight and per unit cost of the various components.

Another additional aim of the present invention is to recover the energy from the leakage and magnetization inductances of the transformer by a part of the circuit during the operating phases of the converter.

Another additional aim of the present invention is to improve the dynamic behaviour of the converter and to increase its handling range.

The present invention relates to a DC/DC converter controlled by a rectangular signal, comprising an input for a source of direct voltage, a transformer comprising a primary winding connected to the source of direct voltage and a secondary winding connected to the load, a single switch in series with the primary winding and the input of the source of direct voltage intended to produce the rectangular signal, as well as a tertiary winding located close to the primary and secondary windings on the core of the transformer.

The tertiary winding is preferably in series with a diode on a branch which is in parallel to the branch comprising the primary winding and the switch.

According to a first characteristic of the invention, the tertiary winding on the transformer has the same direction of winding as the primary winding.

The tertiary winding may be weakly coupled, optionally wound on a separate core.

According to a second characteristic of the invention, the converter comprises electronic components for making up a first current flow circuit to remove at least the energy contained in the leakage inductance and in the magnetization inductance of the transformer, and a second current flow circuit to return this accumulated energy in the form of a reverse magnetization induction to the transformer.

With this aim, a magnetic reversal capacitor for resetting the transformer is provided, preferably placed between the branch comprising the primary winding and the switch and the branch comprising the tertiary winding and the diode, as well as a second diode which is in the blocking direction with respect to the source of direct voltage in series with the tertiary winding.

The first current flow circuit thus comprises the primary winding, the capacitor and the first diode for forming a current flow loop through which flows a current from the primary winding to the capacitor, making it possible to accumulate at least the leakage and magnetization inductance energy of the transformer.

The second current flow circuit comprises the primary winding, the capacitor, the second diode and the tertiary winding for forming a current flow loop with the source of input voltage from the converter, through which loop flows a current from the capacitor to the primary winding to return the energy accumulated on the capacitor to the transformer in the form of a reverse magnetization induction.

The converter according to the present invention advantageously has improved dynamic behavior and improved energy behavior by means of positioning the tertiary winding in the same direction of winding as the primary and secondary windings of the transformer, and by means of adding only two additional components, namely a capacitor and a second diode.

The type of behaviour of the converter is mainly determined by the choice of these two elements and their arrangement in the circuit to lead to the formation of the two abovementioned current flow circuits.

A rectangular signal is obtained from the voltage source by placing the switch cyclically in a conducting phase and in a non-conducting phase. This rectangular signal switching can be carried out in particular at constant frequency by means of a conventional control circuit.

When the switch is a transistor, the control circuit serves to give a control signal of low electrical potential in order to place the transistor in forward phase or in conducting mode.

The absence of this control signal results in blocking of the transistor and thus the non-conducting mode.

During passage from the conducting phase to the non-conducting phase of the switch, the converter circuit first absorbs the energy contained in the transformer by means of a current flow loop comprising the primary winding of the transformer, the capacitor and the first diode. The direction of flow in this loop is determined by the first diode, which will conduct only for a current flowing from the primary winding to the capacitor.

Thus, the energy absorbed at the transformer is stored in the capacitor.

Next, when the magnetization energy is completely removed from the transformer, the converter circuit returns the energy stored in the capacitor in the form of a reverse magnetization induction to the core of the transformer, with the aid of a second current flow circuit comprising in series the primary winding, the capacitor, the second diode and the tertiary winding, these elements forming a loop with the source of input voltage of the converter.

The direction of flow in this loop is determined by the second diode, which will conduct only for a current flowing from the tertiary winding to the capacitor and from the capacitor to the primary winding.

Thus, the energy stored in the capacitor is transferred via the primary and tertiary windings in the form of a reverse magnetization induction to the core of the transformer.

The magnetization and leakage inductances are thus prevented from leading to additional energy losses by first recovering this energy in the converter circuit and then returning this energy to the transformer in the form of a reverse magnetization induction.

An additional characteristic of the present invention relates to the fact that the magnetization current through the transformer, which, due to the fact that it has been reversed during the return of the energy stored in the circuit to the core of the transformer, has a virtually symmetrical bipolar appearance compared with the value 0 for complete demagnetization of the transformer core.

Specifically, the core of the transformer undergoes a positive and negative magnetization induction according to a balanced distribution compared with the completely demagnetized situation.

This results in better use of the core, the volume of which may be reduced by a half or even more, when compared with the cores used in conventional one-switch forward converters.

Another particular advantage of the present invention relates to the conducting period of the switch.

Specifically, as a result of better distribution and use of the transformer's magnetization and leakage energy, this transformer demagnetizes faster, a consequence of which is that the demagnetization time of the core or the non-conducting time of the switch may be shorter than the conducting time of the switch. This phenomenon is characterized by a duty cycle of greater than 50%.

This results in better exploitation of the transformer, whose current DC/DC conversion time is longer than its demagnetization time.

Another advantage of the present invention lies in the fact that the switch produces soft switching due to the fact that sudden variations in voltage across the switch are excluded.

Most particularly, during passage from the conducting phase to the non-conducting phase, the switch cuts the flow of current from the source of input voltage to the primary winding. However, the flow of current in the secondary winding is not thereby cancelled and the secondary winding continues to pass a current which is finally reflected onto the primary winding.

To prevent the image of this secondary current on the primary winding from suddenly increasing the voltage across the switch, the electronic circuit of the converter according to the present invention provides for the image of the secondary current to flow through the capacitor in the first flow circuit.

Thus, the first diode and the capacitor produce a switching circuit, also known as a non-dissipative "snubber", which allows the switch to open at zero voltage and with soft switching.

In addition, the fact that the capacitor is placed in series with the primary winding brings about damping of any parasitic oscillations, thus making it possible to reduce the size and complexity of any filtering circuits.

Another advantage of the converter according to the present invention lies in the fact that the maximum voltage across the switch S remains constant. Specifically, the maximum voltage across the switch S is proportional both to the input voltage ($V_{DC}$) and to the duty cycle (D). The maximum stress is thus proportional to the product $V_{DC} \times D$, i.e. to the output voltage, which is often regulated and thus constant.

Considering that the duty cycle D can take a value greater than 50%, a wide range of values is obtained. In particular, the supply voltage $V_{DC}$ at the converter input can readily be chosen within a range extending from once to twice the value and which is, for example, between 40 volts and 80 volts or even more, without, however, having to use components of larger value or size for the core of the transformer and the switch.

The duty cycle may thus be chosen within a range from 0 to 100%.

Finally, the converter according to the present invention especially has flexible dynamic behavior, in particular in passing from one mode of stationary functioning to another mode of stationary functioning by simply varying the duty cycle or the input voltage or the like. The converter then rapidly finds a stationary regime without system runaway.

In general, the combination of all the advantages mentioned above (while at the same time maintaining a very simple control with only one switch) is certainly not encountered in the assemblies known to date.

In addition, while it is accepted that, according to the prior art, switching circuits, protective circuits and filter circuits are required for correct functioning, the converter according to the present invention comprises overall fewer electronic components than those already known.

According to another preferred embodiment, a third diode is provided in parallel on the tertiary winding and the second diode of the second flow circuit.

Preferably also, a quaternary winding is provided, arranged in series with the third diode.

Other characteristics and advantages of the invention will become apparent on reading the description illustrating one preferred embodiment of the invention.

DETAILED DESCRIPTION OF SEVERAL PREFERRED EMBODIMENTS OF THE INVENTION

The subject of the invention will first be described taking the diagram in FIG. 1, which represents the electronic diagram of the DC/DC converter according to the present invention, as the starting point.

The electronic diagram can be subdivided into two circuits including the input circuit comprising the primary and tertiary windings of the transformer and the output circuit comprising the secondary winding of the transformer.

The output circuit acts as an output filter and comprises the following electronic components: a diode DS1, a coil L in series with the secondary winding 2 and a diode DS2, a capacitor CS and a load RL in parallel with the secondary winding, the diode DS2 and the capacitor being arranged on either side of the coil L.

The input circuit serves as the conduction, demagnetization and restoration circuit of the converter. It comprises the source of direct voltage symbolized by $V_{DC}$ which constitutes the converter's source of energy and power supply. The primary winding 1 of the transformer is found in series with the switch S at the terminals of the voltage source. In addition, the input circuit can be subdivided into two current flow circuits, in particular a first current flow circuit and a second current flow circuit.

The first current flow circuit is a loop consisting of the primary winding 1, the capacitor C and the diode D1.

Only the conducting direction of the diode D1 allows a current flow from the primary winding 1 to the capacitor C.

The second current flow circuit comprises, at the terminals of the voltage source $V_{DC}$, the primary winding 1 in series with the capacitor C, the diode D2 and the tertiary winding 3. Only the conducting direction of the diode D2 allows a current to flow from the tertiary winding 3 to the capacitor C and from the capacitor C to the primary winding 1 of the transformer.

In addition, the primary winding 1, secondary winding 2 and tertiary winding 3 are biased in the same direction and the number of turns n3 on the tertiary winding 3 is not more than the number of turns n1 on the primary winding.

The ratio n3/n1=0.8 is preferably used to ensure correct functioning of the converter according to the invention.

During the conducting phase of the switch S, i.e. in the closed position, the energy is withdrawn at the voltage source $V_{DC}$ via the primary winding 1 and secondary winding 2 of the transformer and is transmitted directly to the output filter.

The path taken by the current in the input circuit goes from the voltage source $V_{DC}$ to the primary winding 1, and then via the switch S in the closed position to the voltage source $V_{DC}$ to close the flow loop.

In the output circuit, the current flows in the conducting direction of the diode DS1 through the coil L to power an output load symbolized by RL.

During the non-conducting phase of the switch S, i.e. when the said switch is in the open position, the flow of current from the supply voltage source $V_{DC}$ to the primary winding 1 is cut. However, in the output circuit, the current continues to flow through the diode DS1 for as long as this diode is forward-biased. Next, the current flow is induced by the coil L in the conducting direction of the diode DS2.

During switching from the conducting phase to the non-conducting phase, several steps may be defined for the input circuit of the converter.

First, a first current flow is observed through the primary winding 1, the capacitor C and the diode D1 to remove, from the primary winding 1, the energy from the image of the secondary current flowing through the secondary winding 2 of the transformer, the leakage inductance and the magnetization inductance of the transformer. This energy is mainly stored in the capacitor C.

When the magnetization induction in the transformer is completely absorbed, a second current flow is established in the input circuit through the tertiary winding 3, the diode D2, the capacitor C and the primary winding 1. The current flow induced via the conducting direction of the diode D2 from the capacitor C to the primary winding makes it possible to return this energy stored in the capacitor to the core of the transformer in the form of a reverse magnetic induction.

The switching of the switch S to the closed position induces a flow of current from the tertiary winding through the diodes D2 and D1 and makes it possible to restore the initial voltage conditions across the capacitor.

The description hereinabove explains the behavior of the various electronic components of the converter circuit as well as the current flow paths which are characteristic of the converter according to the present invention.

FIGS. 2 to 8 represent block diagrams of the functioning of the converter according to the invention. The functioning of the converter according to the invention can be divided into seven phases. These different phases are denoted by phases 0 to 6 and are described in FIGS. 9 to 15.

Phase 0 constitutes the phase of functioning of the converter when the switch is closed, i.e. in conducting mode.

Phases 1 to 6 constitute the phases of functioning of the converter from switching from the conducting mode to the non-conducting mode of the switch up to switching from the non-conducting mode to the conducting mode of the switch.

Figure 2:
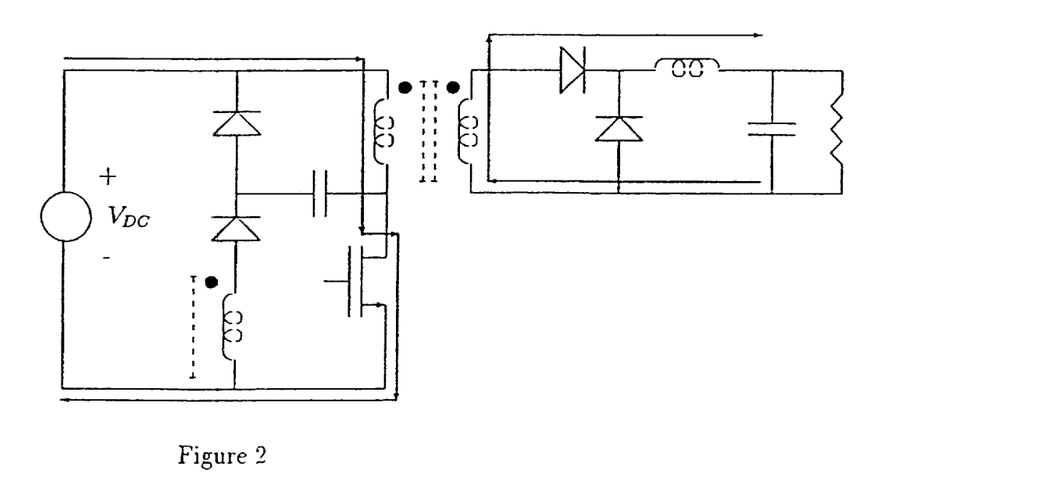
FIG. 2 represents a block diagram illustrating the functioning of the DC/DC converter according to the invention during the conducting phase of the switch.

Phase 0: Phase of transferring the energy from the source $V_{DC}$ to the load RL through the transformer As illustrated in FIG. 2, the energy transfer induces an increase in the current $i_O$ through the coil L. In addition, a linear increase in the magnetization current $i_M$ on the core of the transformer is also found.

Specifically, during this phase, the magnetization inductance of the transformer stores the energy from the source $V_{DC}$.

Figure 9:
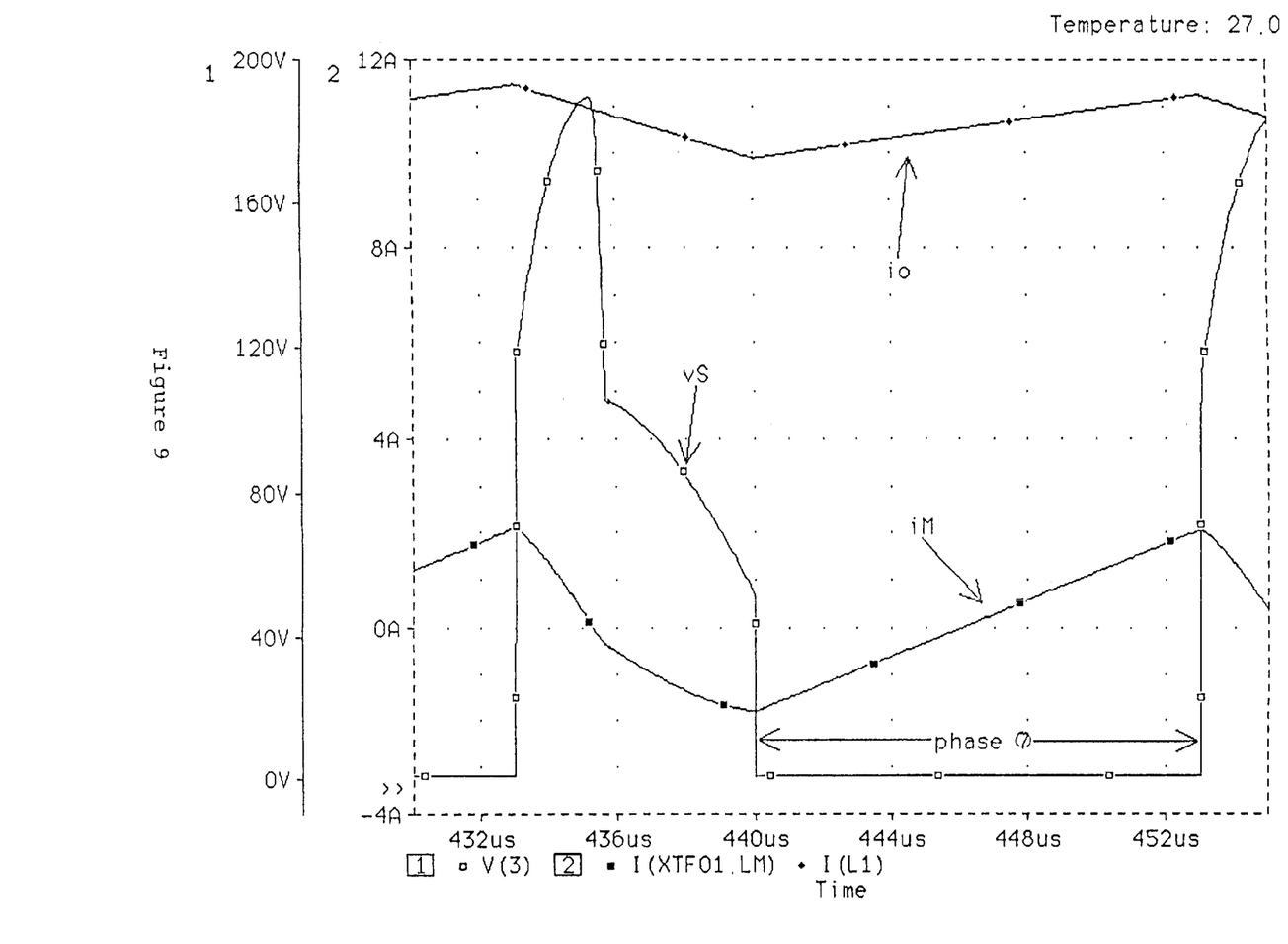
FIGS. 9 to 15 represent the waveforms of the voltages and currents during phases 0 to 6 shown in FIGS. 2 to 8, respectively.

The shapes of the currents $i_O$ and $i_M$ and of the voltage $V_S$ are represented in FIG. 9.

Phase 1: Phase of transferring the secondary current

Figure 3:
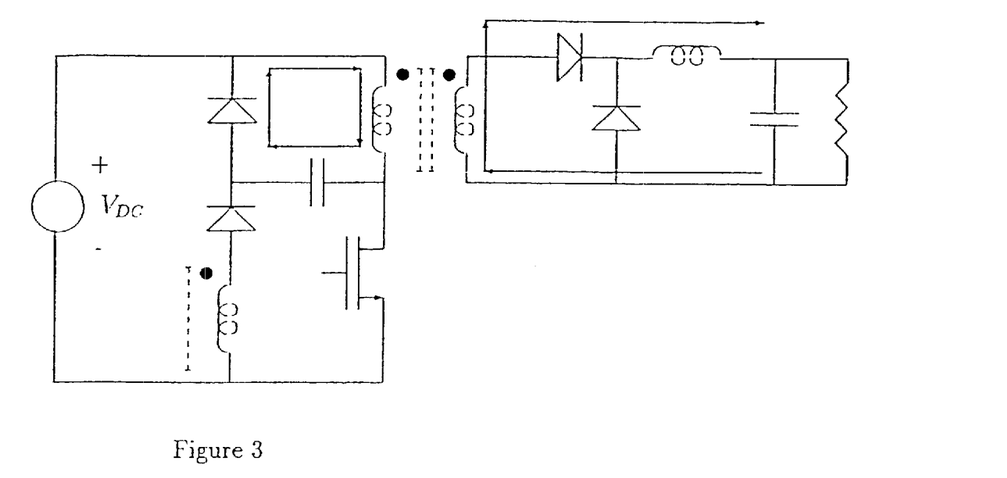
FIG. 3 represents a block diagram illustrating the functioning of the DC/DC converter according to the invention during the phase of transferring the secondary current.

At the start of this phase, the switch opens and passes from the conducting mode to the non-conducting mode. As illustrated in FIG. 3, the image of the secondary current is reflected onto the primary winding and charges the capacitor C by increasing the voltage $V_C$ across it. The capacitor C slows down the increase in voltage $V_S$ across the switch S, which can then open in soft switching mode.

This phase ends when the voltage $V_1$ across the transformer, i.e. the primary winding, is cancelled.

Figure 10:
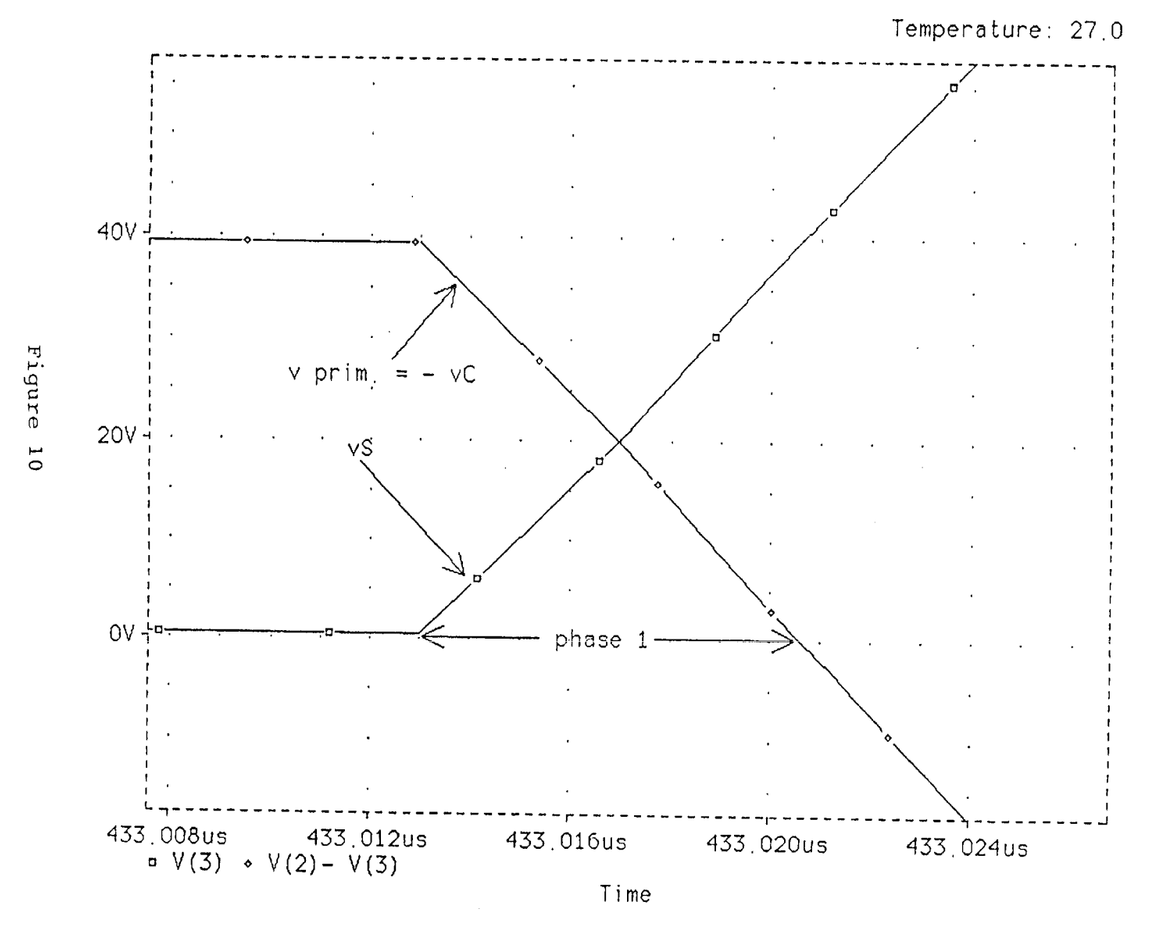

The shapes of the voltages $V_S$ and $V_C$ are represented in FIG. 10.

Phase 2: Phase of transferring the leakage induction

Figure 4:
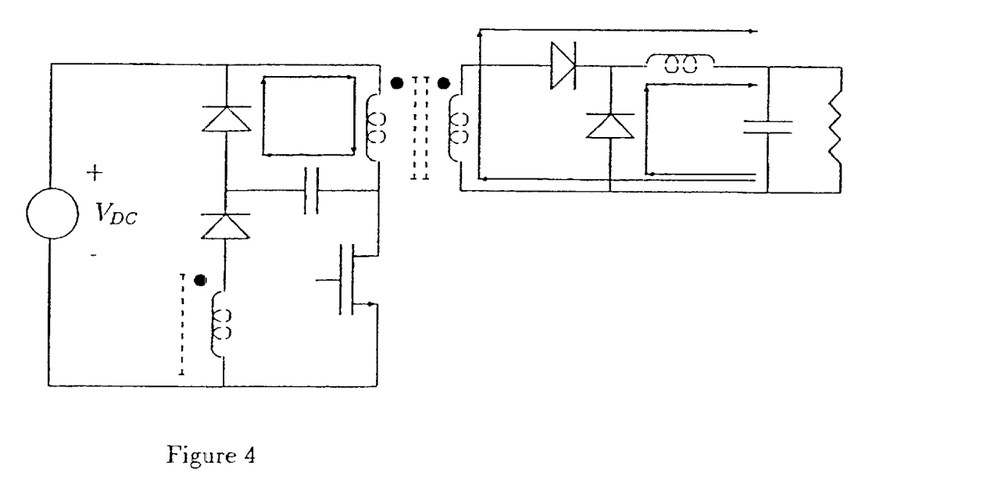
FIG. 4 represents a block diagram illustrating the functioning of the DC/DC converter according to the invention during the phase of transferring the leakage induction.

As illustrated in FIG. 4, during this phase, the energy contained in the leakage inductance of the transformer is transferred to the capacitor C, the voltage $V_C$ across which continues to increase.

This phase ends when the current flow $i_{DS1}$ through the diode DS1 is cancelled.

Figure 11:
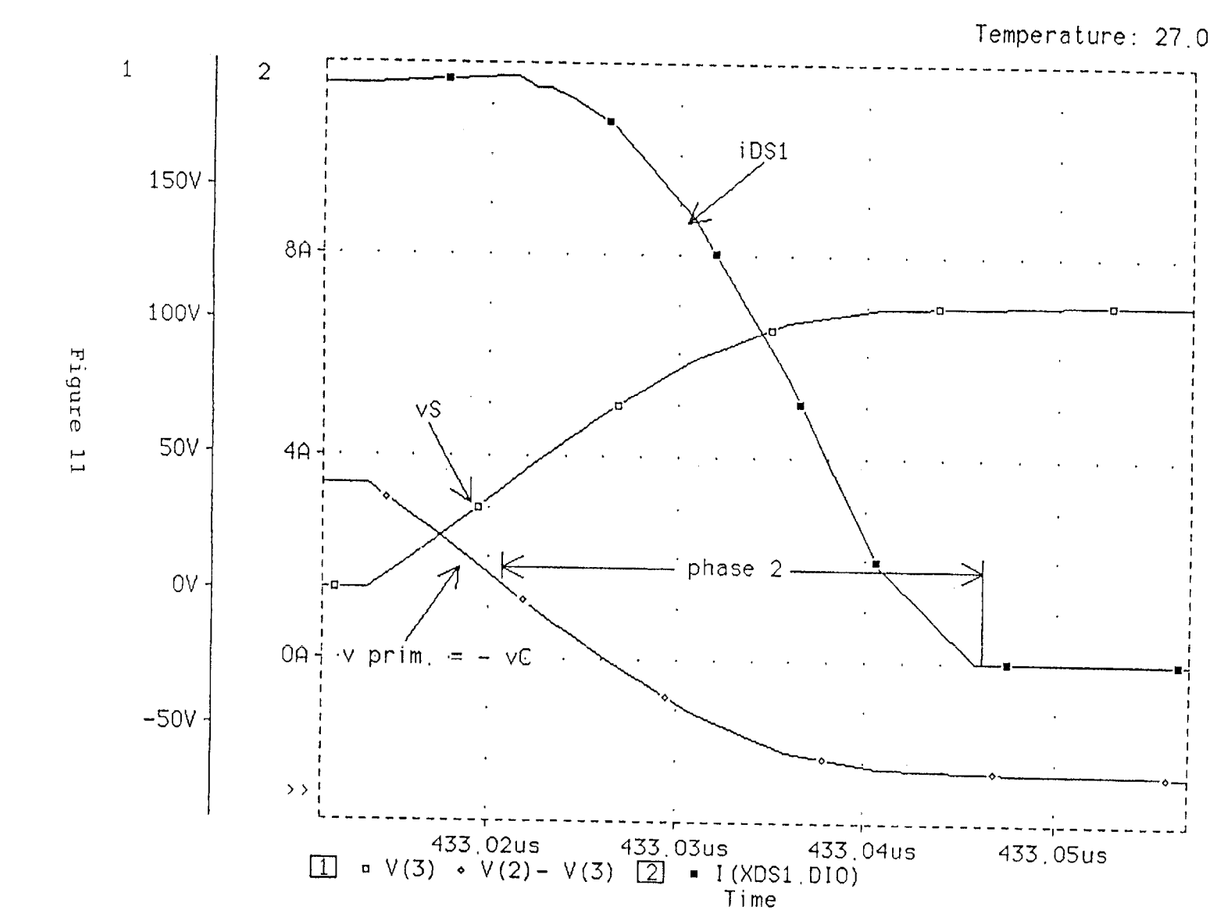

The shapes of the voltages $V_S$ and $V_C$ and of the current $i_{DS1}$ are represented in FIG. 11.

Phase 3: Phase for transferring the magnetization induction

Figure 5:
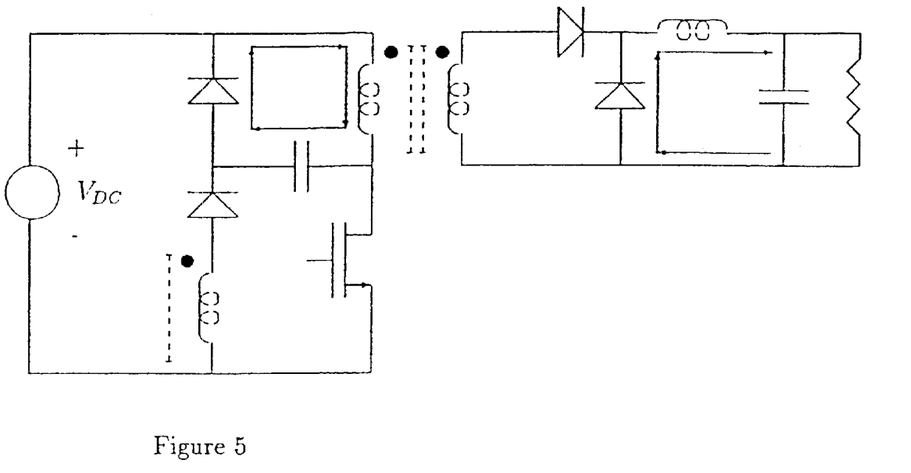
FIG. 5 represents a block diagram illustrating the functioning of the DC/DC converter according to the invention during the phase of transferring the magnetization induction.

As illustrated in FIG. 5, during this phase, the energy contained in the magnetization inductance of the transformer is transferred to the capacitor C, the voltage $V_C$ across which continues to increase.

This phase ends when the magnetization induction $i_M$ is cancelled on the core.

By the very fact that all the energy at the end of phase 3 arising from the image of the secondary current, the leakage inductance and the magnetization inductance of the core has been removed, the voltages across the capacitor $V_C$ and across the switch $V_S$ reach a maximum value. In addition, it should be noted that during phase 3, the currents $i_O$ and $i_{DS2}$ induced by the coil L in the conducting direction of the diode DS1 decrease over time.

Figure 12:
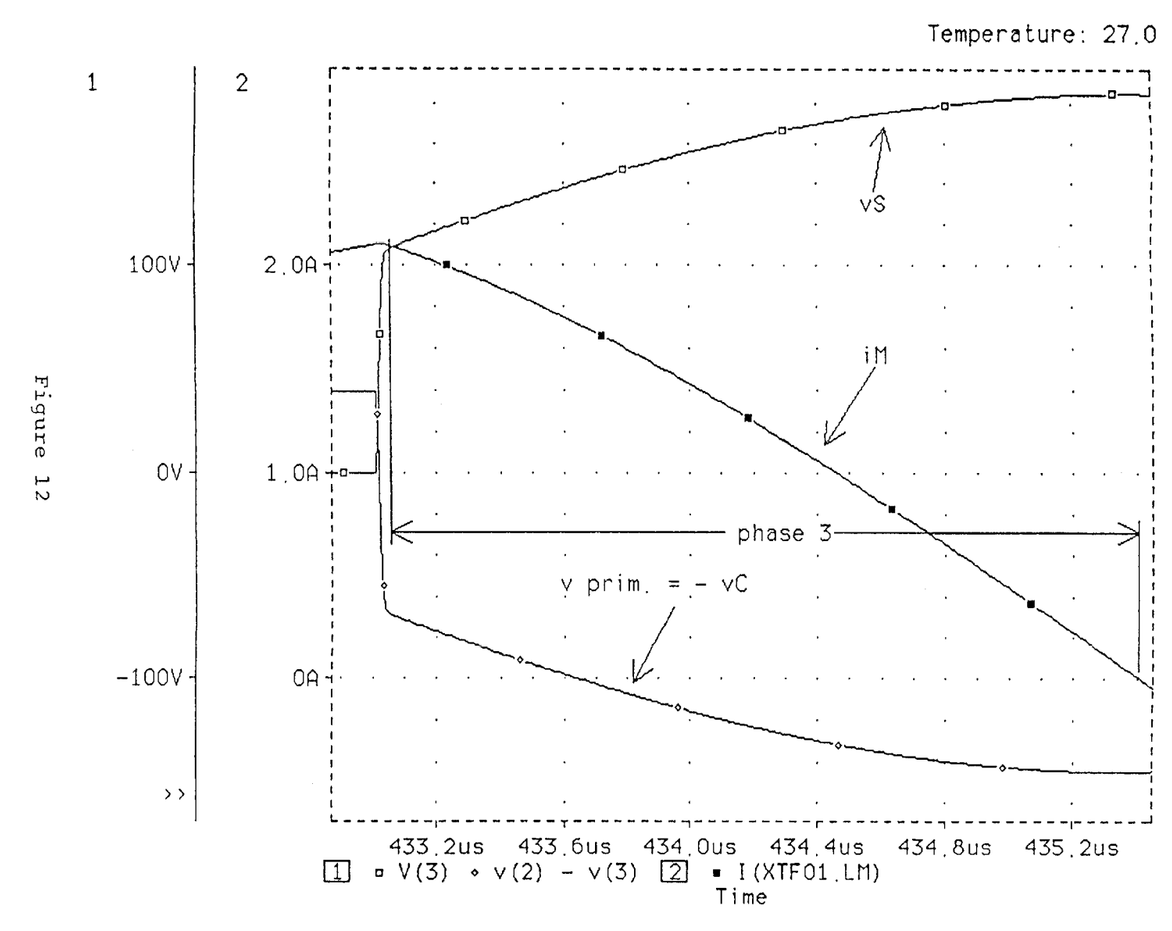

The shapes of the voltages $V_S$ and $V_C$ and also of the current $i_M$ are represented in FIG. 12.

Figure 6:
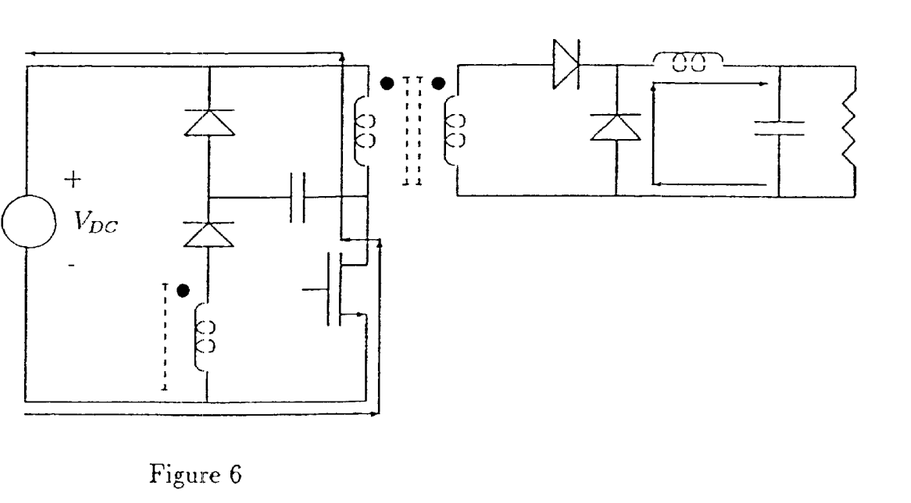
FIG. 6 represents a block diagram illustrating the functioning of the DC/DC converter according to the invention during the phase of transferring the energy stored in the capacitance inside the switch S to the transformer.

Phase 4: Transfer of the energy stored in the capacitance inside the switch to the transformer During this very short phase of functioning of the converter, the capacitance $C_P$ inside the switch S comes into resonance with the magnetization inductance, thereby inducing a current from the capacitor $C_P$ inside the switch to the primary winding of the transformer.

As illustrated in FIG. 6, the result of this is that the magnetization induction $i_M$ on the core of the transformer is reversed and becomes negative and the voltage across the switch $V_S$ decreases rapidly.

In addition, the voltage across the primary winding is reflected onto the tertiary winding.

This phase ends when the potential difference across D2 is such that D2 enters into a conducting phase, i.e. it becomes conducting.

Figure 13:
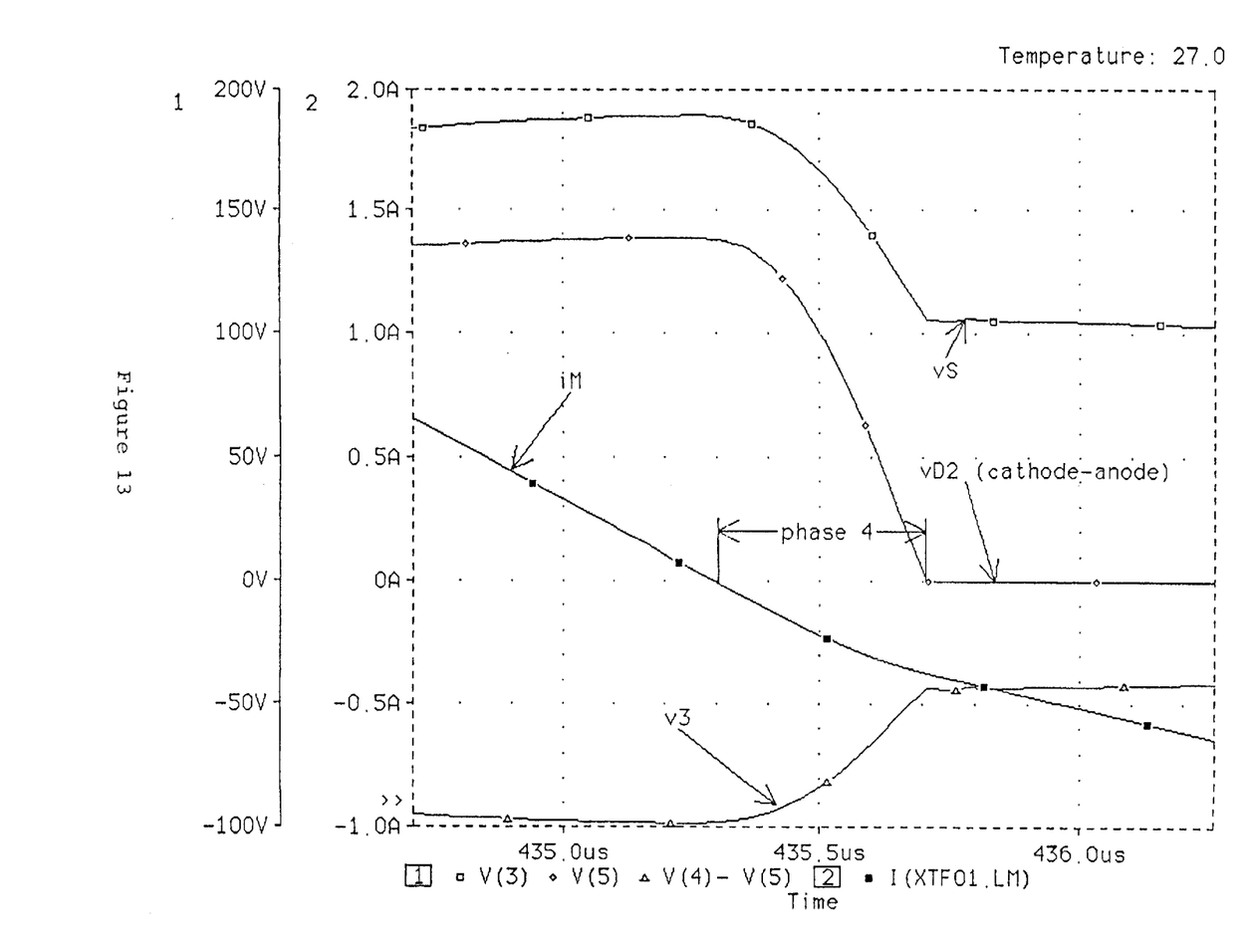

The shapes of the voltages $V_S$, $V_3$ and $V_{D2}$ and of the current $i_M$ are represented in FIG. 13.

Figure 7:
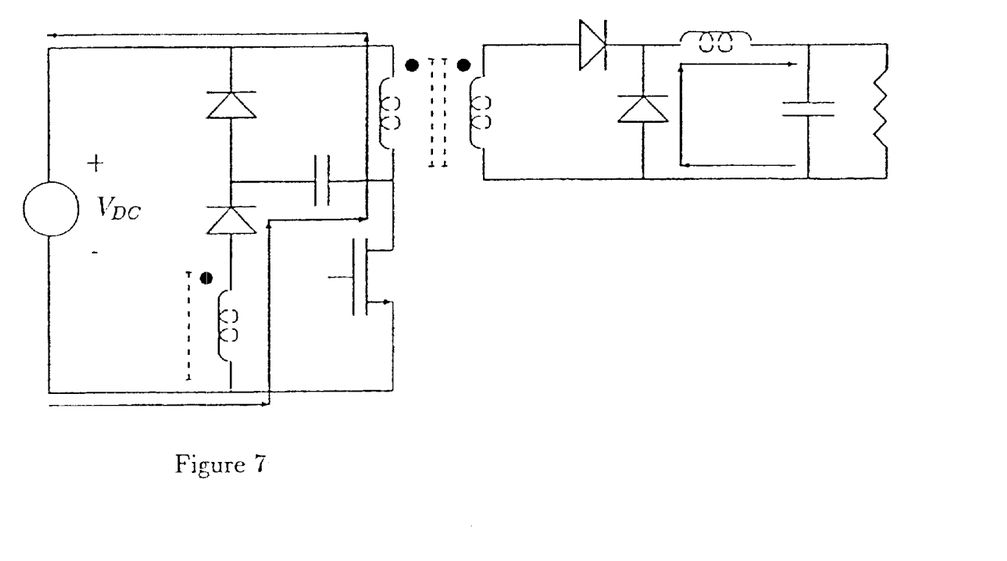
FIG. 7 represents a block diagram illustrating the functioning of the DC/DC converter according to the invention during the phase of transferring the magnetization energy stored in the capacitor to the transformer.

Phase 5: Transfer of the magnetization energy stored on the capacitor C to the transformer During this phase, the diode D2 enters into conducting mode to the effect that the two primary and tertiary windings of the transformer are in series with the capacitor C.

An energy transfer then takes place from the capacitor C to the magnetization inductance of the transformer.

As illustrated in FIG. 7, this step is characterized by the conducting mode of the diode D2. Following passage of the current through the capacitor C, which discharges through the primary winding, a voltage drop $V_C$ across the capacitor C and a more and more negative increase in the reverse magnetization induction $i_M$ on the transformer are observed.

This phase is also characterized by a voltage drop $V_S$ across the switch S and the primary and tertiary windings (cf. FIG. 7).

This phase ends when the voltage $V_C$ across the capacitor is approximately $V_{DC}$.

Figure 14:
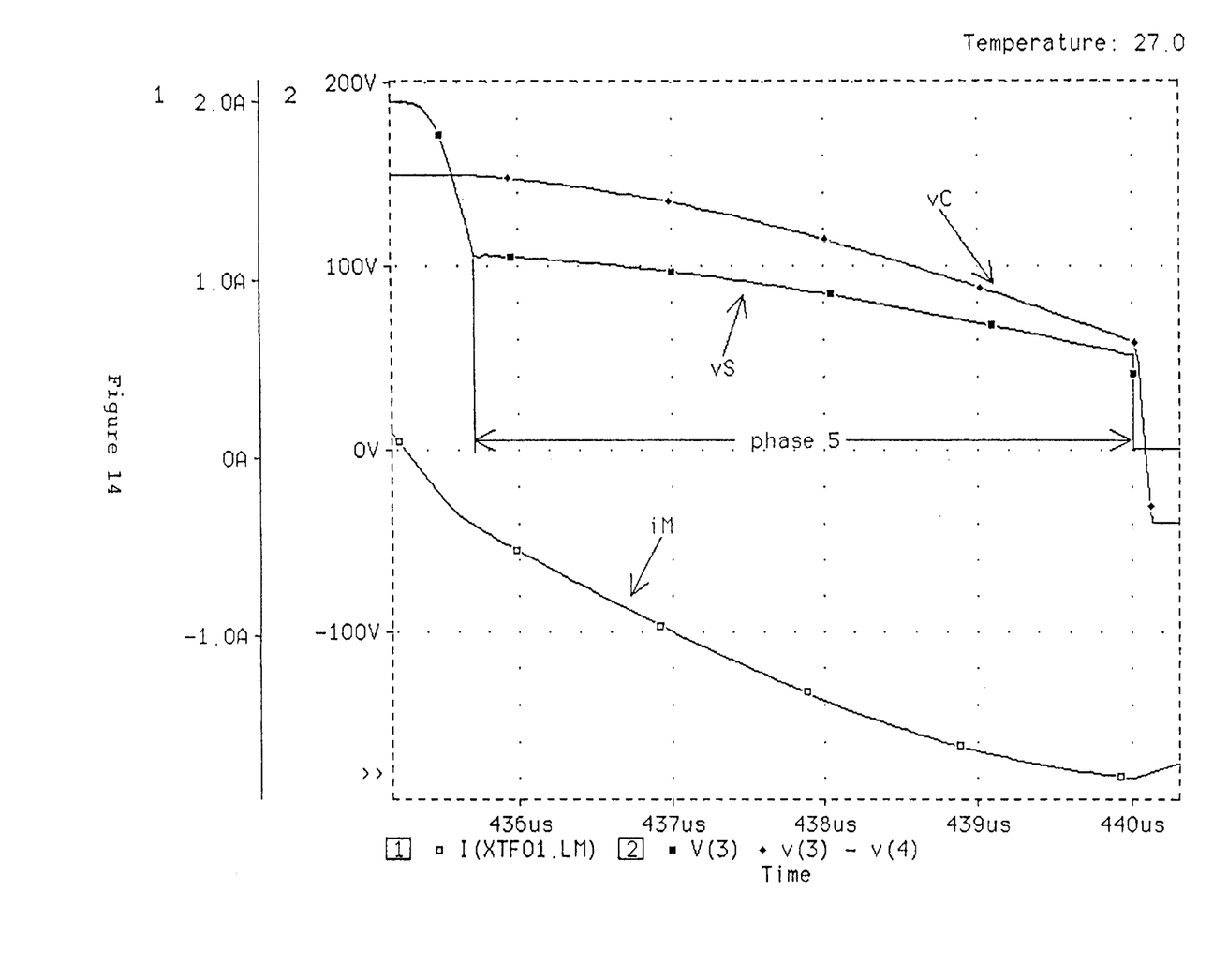

The shapes of the voltages $V_C$ and $V_S$ and of the current $i_M$ are represented in FIG. 14.

Phase 6: Restoration of the voltage across the capacitor C

Figure 8:
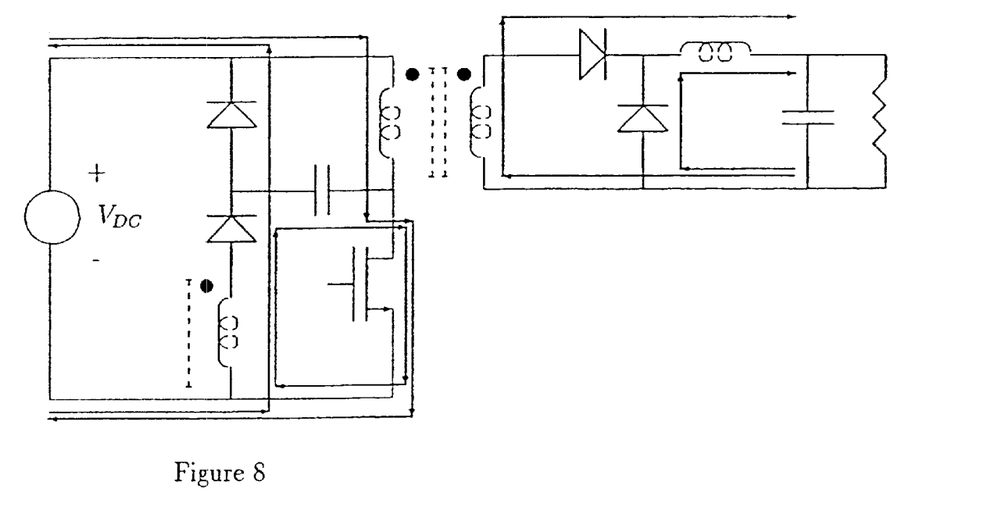
FIG. 8 represents a block diagram illustrating the functioning of the DC/DC converter according to the invention during the phase of restoring the voltage across the capacitor to the initial state.

This phase makes it possible to restore the initial state of the capacitor. As illustrated in FIG. 8, the restoration step is characterized by the passage of a large current $i_{D2}$ or $i_{D1}$ through the respective diodes D2 and D1, thus allowing a voltage drop $V_C$ from $V_{DC}$ to $-V_{DC}$.

In the output filter circuit, this phase is characterized by a current $i_{DS1}$ in the diode DS1 which begins to increase. When the current $i_{DS1}$ reaches the value $i_O$ across the coil, the current $i_{DS2}$ across the diode DS2 is cut (cf. FIG. 8).

Figure 15:
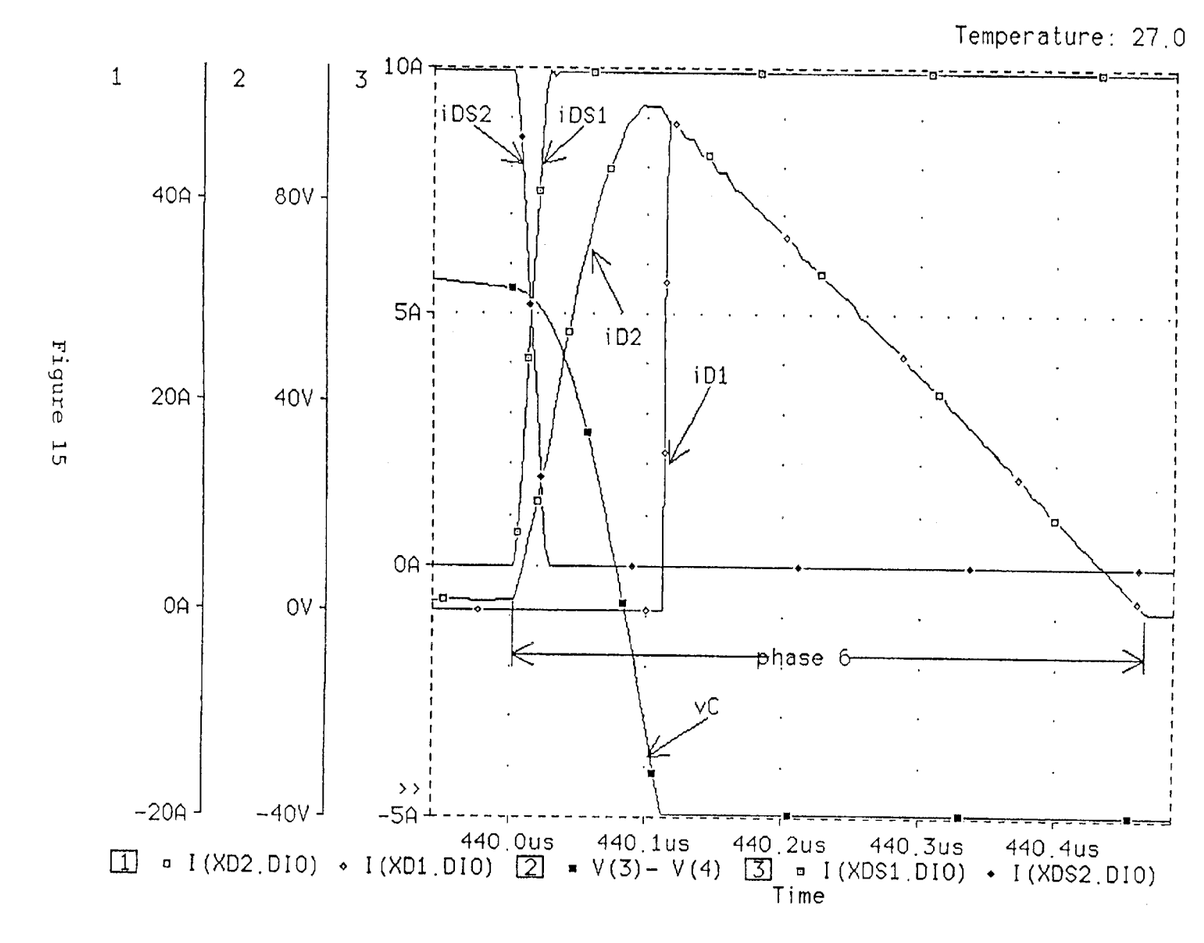

The shapes of the voltage $V_C$ and of the currents $i_{DS1}$, $i_{DS2}$, $i_{D2}$ and $i_{D1}$ are represented in FIG. 15.

Figure 1:
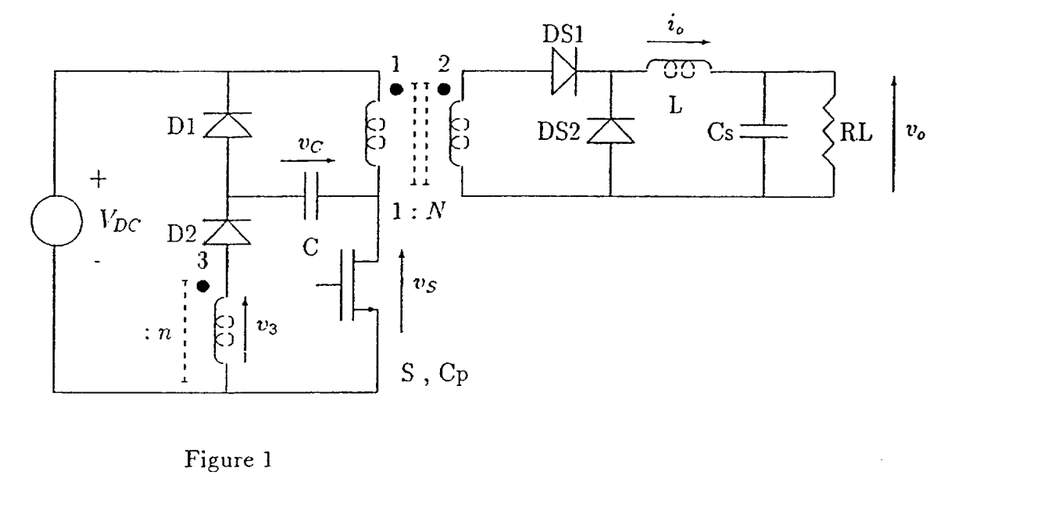
FIG. 1 represents an electronic diagram of the DC/DC converter according to the invention.
Figure 16:
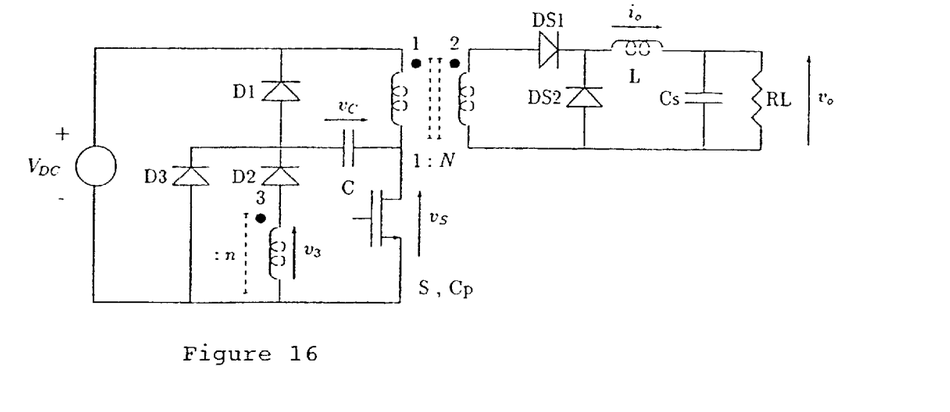
FIGS. 16, 17, 18 and 19 represent other preferred embodiments of the present invention.
Figure 17:
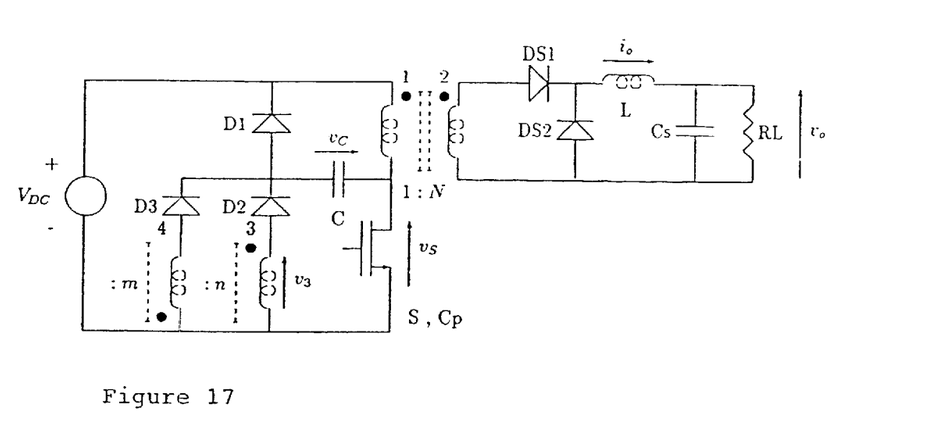

FIGS. 16 and 17 represent two other embodiments of the DC/DC conversion circuit according to the present invention, in which it is desired to improve the characteristics of the circuit by making it possible to obtain a duty cycle which is even greater than that obtained using the arrangement in FIG. 1, without, however, increasing the voltage stresses on the switch S.

As represented in FIG. 16, it is proposed to shorten the duration of phase 5 by adding a diode D3 to the second flow circuit in parallel with the tertiary winding 3 and the diode D2.

According to another embodiment which is also preferred, represented in FIG. 17, an additional winding 4 is added to the transformer in order to allow phase 5 to start earlier and to obtain an even faster change of voltage across the capacitor C by means of an even lower equivalent impedance of the transformer. In this case, the equivalent magnetization impedance of the transformer seen by the circuit will have to be multiplied by $(1-m)^2$ if m is the factor for the additional winding 4 of the transformer (relative to the primary winding).

It should be noted, however, that the diode D3 and the winding 4 carry a very low current, which means that they can be of relatively small size compared with the other components. This obviously reduces their cost.

During phase 5, the path of the current through the diode D2 and the winding 3 is replaced with a path through the diode D3 (see FIG. 16) and possibly the winding 4 (see FIG. 17).

The maximum voltage $V_S$ is limited in this case to $V_{Smax} = V_{DC}(1+1/m)$.

In the final embodiment, it is observed that the winding 4 will serve as an absolute field for the voltage applied to the switch S.

The circuit proposed in FIG. 1 is an "asymmetric" circuit relative to the power supplies, i.e. it has no axis of symmetry.

Any asymmetric assembly has a corresponding dual assembly which can be obtained by reversing the role of the power supplies.

A symmetric circuit can thus be created by placing an asymmetric circuit in series with its dual assembly.

Figure 18:
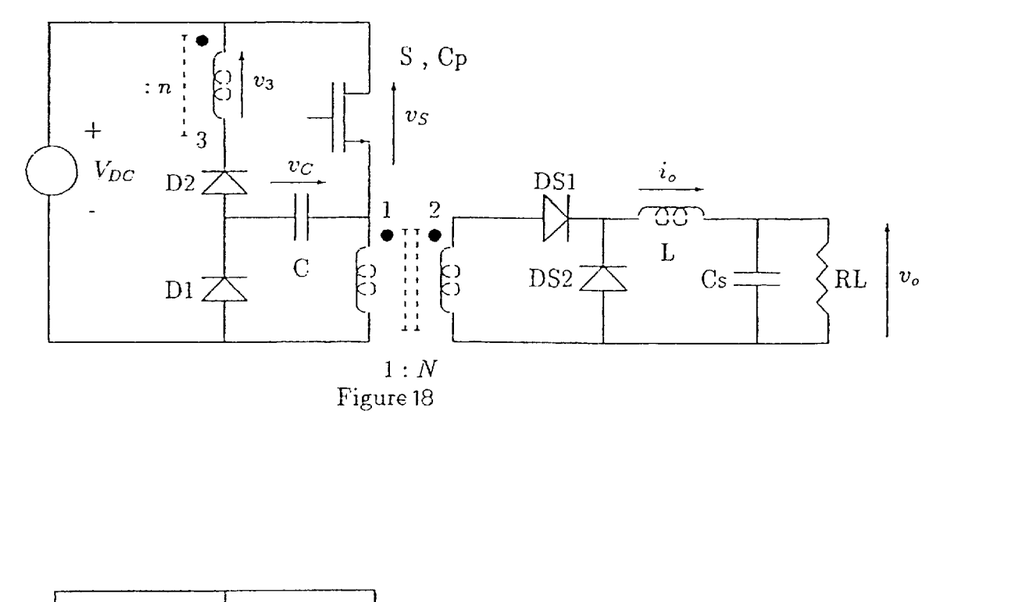
Figure 19:
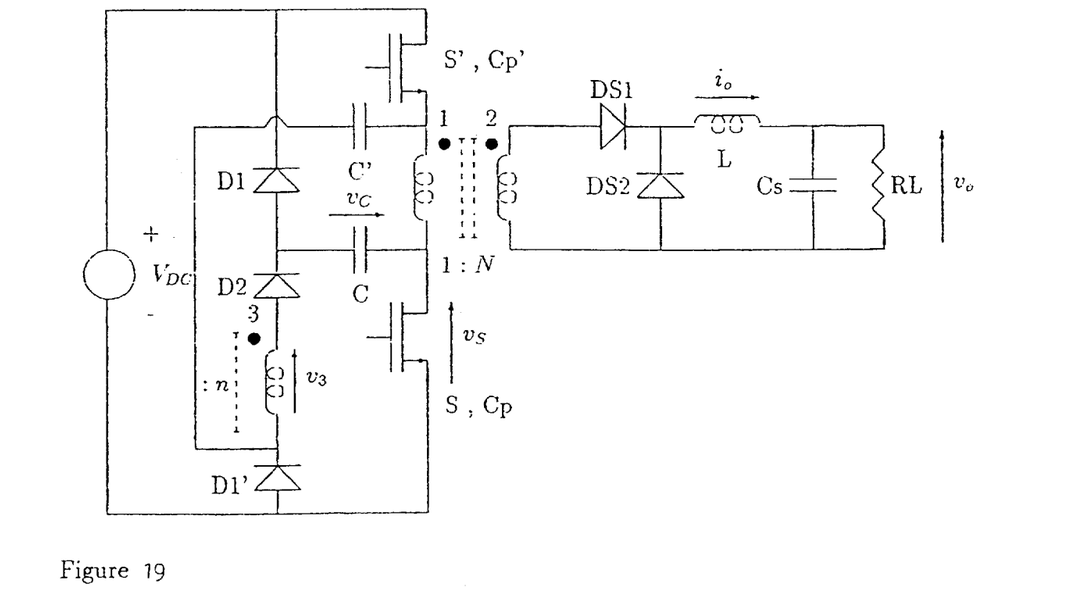

Thus, FIG. 19 which describes a symmetric circuit is simply obtained by arranging a circuit as described in FIG. 1 in series with its dual assembly as described in FIG. 18.

The change of the magnitudes is entirely analogous to that of the base assembly. Phases 1 to 6 are still present and identical. Only the voltage stresses are divided in two on the components placed in series (S, S' and D1, D1' in this instance). This makes the symmetric version an advantageous version of the circuit for larger voltages $V_{DC}$ (for example several hundred volts).

What is claimed is:

1. A DC/DC converter controlled by a rectangular signal, comprising:

an input for a source of direct voltage;

a transformer comprising a primary winding connected to the source of direct voltage, a secondary winding connected to an output of the DC/DC converter, and a tertiary winding located in proximity to the primary winding and the secondary winding on a core of the transformer, wherein the tertiary winding has a direction of winding that is the same as a direction of winding of the primary winding, and wherein a terminal of the primary winding and a terminal of the tertiary winding are identically biased and coupled to a first terminal of the source of direct voltage;

a controllable switch connected in series with the primary winding and the input of the source of direct voltage;

a first diode and a second diode, the diodes connected in series with the tertiary winding and in a blocking direction with respect to the source of direct voltage; and a magnetic reversal capacitor for resetting the transformer.

2. The converter of claim 1, wherein the tertiary winding and the first diode are arranged in a circuit branch that is parallel to a circuit branch including the primary winding and the controllable switch.

3. The converter of claim 2, wherein the switch has a closed position in which a first circuit includes the primary winding, the capacitor and the first diode, and wherein a first loop current flows from the primary winding to the capacitor to accumulate at least a leakage and a magnetization inductance energy of the transformer.

4. The converter of claim 3, wherein the switch has an open position in which a second circuit includes the primary winding, the capacitor, the second diode and the tertiary winding, wherein the second circuit is coupled to the source of direct voltage, and wherein a second loop current flows from the capacitor to the primary winding to return energy accumulated in the capacitor to the transformer in form of a reverse magnetization induction.

5. The converter of claim 4, wherein during a switching from the closed position to the open position of the switch, the first circuit slows down an increase of a voltage across the switch by transferring an image of a current flowing in the secondary winding to the capacitor.

6. The converter of claim 5, wherein the second circuit provides for initial conditions to be restored by passing the first loop current from the tertiary winding to the capacitor.

7. The converter of claim 1, wherein the converter has a duty cycle having a variation range from 0 to 100%.

8. The converter of claim 1, wherein a maximum operating voltage applied to the switch depends only on an output voltage of the converter.

9. The converter of claim 1, wherein a voltage range applied to the input of the converter is adjustable.

10. The converter of claim 1, wherein the transformer provides for a magnetization current having a maximum amplitude corresponding to amplitudes of polarities of the magnetization current.

11. The converter of claim 2, wherein a passage of current through the capacitor results in a decrease in a variation of a voltage across the switch.

12. The converter of claim 1, wherein a duty cycle comprises at least one phase during which energy is returned in form of a reverse magnetization induction by resetting the transformer.

13. The converter of claim 1, wherein a complete operating cycle of the converter comprises:
 a conducting phase of the switch during which energy from the source of direct voltage is transferred via the transformer to a load;
 a non-conducting phase of the switch, comprising:
  a first phase of transferring a secondary current;
  a second phase of transferring a leakage induction;
  a third phase of transferring a magnetization induction;
  a fourth phase of transferring energy stored on the capacitor to the transformer;
  a fifth phase of transferring the magnetization energy stored on the capacitor to the transformer;
  a sixth phase of restoring a voltage across the capacitor.

14. The converter of claim 1, further comprising a third diode provided in parallel to the second diode and to the tertiary winding of the second flow circuit.

15. The converter of claims 14, further comprising a quaternary winding arranged in series with the third diode.

16. A DC/DC converter controlled by a rectangular signal, comprising:
 an input for a source of direct voltage;
 a transformer comprising a primary winding connected to the source of direct voltage, a secondary winding connected to the output of the converter, and at least one tertiary winding located in proximity to the primary winding and the secondary winding on a core of the transformer, wherein the tertiary winding has a direction of winding that is the same as a direction of winding of the primary winding, and wherein a terminal of the primary winding and a terminal of the tertiary winding are identically biased and coupled to a first terminal of the source of direct voltage;
 a first controllable switch and a second controllable switch, the controllable switches connected in series with the primary winding and the input of the source of direct voltage;
 a first diode and a second diode, the diodes connected in series with the tertiary winding and in blocking direction with respect to the source of direct voltage; and
 a first magnetic reversal capacitor and a second magnetic reversal capacitor for resetting the transformer, wherein the first switch, the first capacitor and the first diode are arranged symmetrically with respect to a mid-point of the primary winding and with respect to the second switch, the second capacitor and the second diode.

* * * * *